INVENTORS
ROBERT G. NIGHTINGALE
JACK W. PEARSON

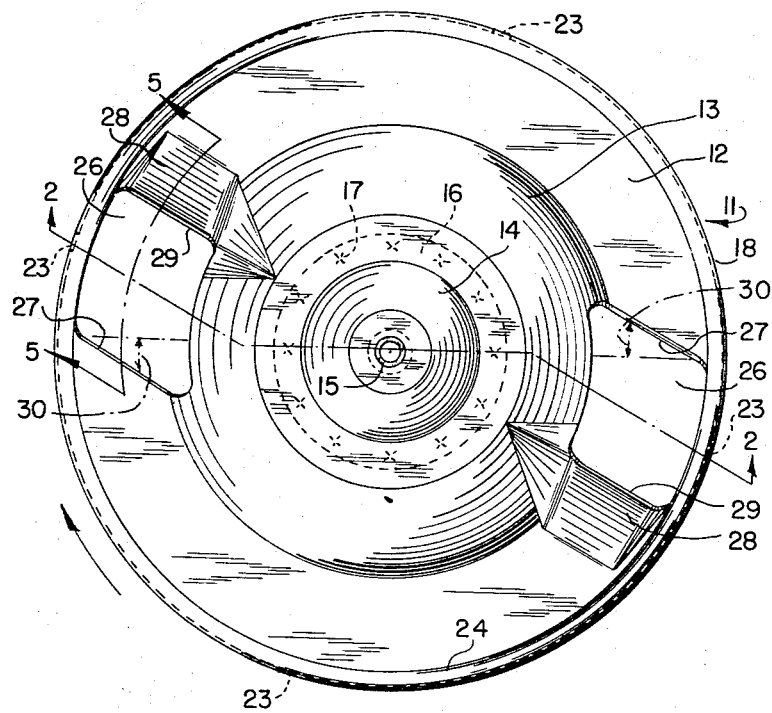
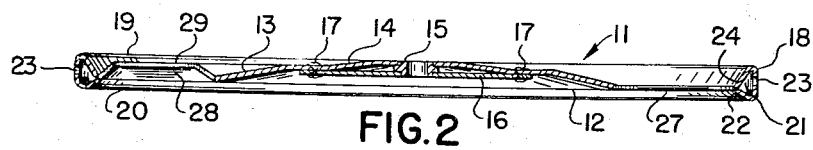
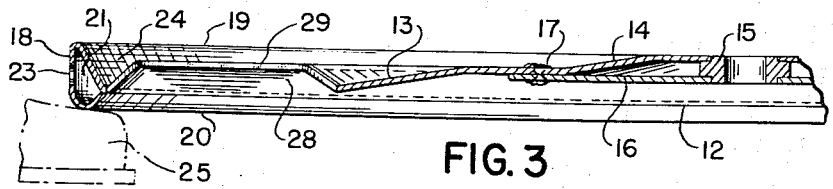
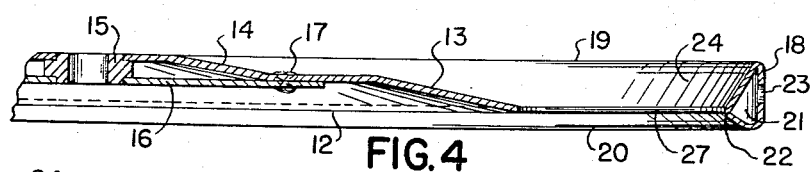
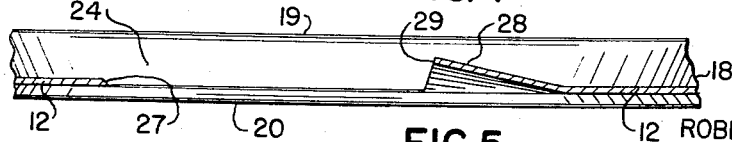

ATTORNEYS

United States Patent Office 3,338,039
Patented Aug. 29, 1967

3,338,039
ROTARY CUTTING BLADE
Robert G. Nightingale, 1035 Gulf Road, and Jack W. Pearson, 121 Miami Ave., both of Elyria, Ohio 44035
Filed Nov. 19, 1963, Ser. No. 324,787
3 Claims. (Cl. 56—295)

Our invention relates to rotary cutting blades as for mowers used in cutting grass and other vegetation.

An object of our invention is to provided an improved structure in a rotary cutting blade so designed as to minimize dangers in the use of the same.

Another object is the provision in a cutting blade for guarding the cutting edges by a guard rotatable with the blade and extending downwardly around the periphery of the blade so as to guard against intrusion of objects, such as a foot of the mower operator, into the path of the cutting edges.

Another object is the provision for simultaneously drawing air upwardly in advance of the cutting edges carried by a rotary cutting blade in an efficient manner so as to position the grass for cutting action.

Another object is the provision for an improved arrangement of the cutting edge provided on a rotary cutting blade to increase the efficiency of the cutting action during rotation of the cutting blade.

Another object is the provision for obtaining an improved suction by a cutting blade to facilitate the cutting action.

Another object is the providing of a guard against inadvertent cutting of an operator, notwithstanding mistaken reversal of the cutting blade in mounting the same on a mower.

Another object is the provision of improved means for throwing out by centrifugal force material disposed above a cutting blade so as to safely discharge the same.

Another object is the provision of a structure in a cutting blade arranged so as to deflect material, such as stones and the like, which may be centrifugally thrown out by the cutting blade and to divert the same from a path which might otherwise cause injury if such material were not deflected.

Another object is the provision for an improved rim structure on a cutting blade which meets the requirements of the blade in operation, and further which may be maintained in equilibrium by the dispersing of any water or the like inadvertently entering the interior of the rim portion.

Another object is the provision of a cutting blade having a strong rigid structure and which provides improved efficiency in cutting operation and at the same time greatly enhances the safety of the operator using a mower which incorporates such a cutting blade.

Other objects and a fuller understanding of our invention may be had by referring to the following description and claims, taken in conjunction with the accompanying drawings, in which:

FIGURE 1 is a top plan view of a rotary cutting blade embodying the preferred form of our invention;

FIGURE 2 is a cross-sectional view taken through the line 2—2 of FIGURE 1;

FIGURE 3 is an enlarged view of the left half of FIGURE 2;

FIGURE 4 is an enlarged view of the right half of FIGURE 2, FIGURES 3 and 4 representing the structure on diametrically opposite sides of the cutting blade;

FIGURE 5 is an enlarged sectional view taken through the line 5—5 of FIGURE 1;

Figure 6:
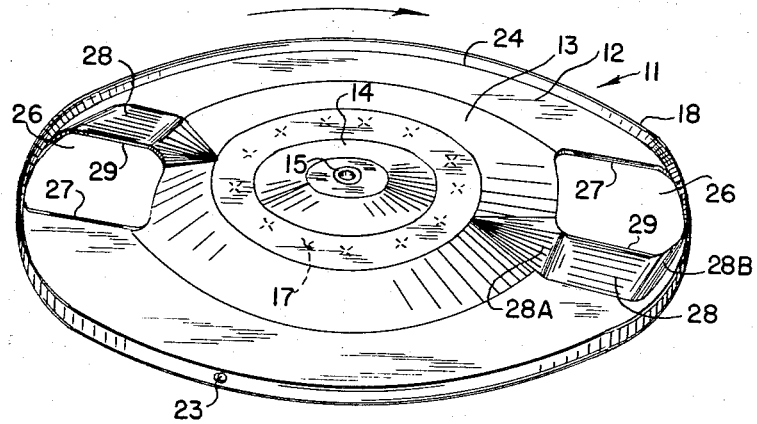
FIGURE 6 is a perspective view looking down on the top of our referred form of cutting blade.

Our cutting blade is preferably made of a stamping of suitable hard metal, such as tempered steel or an appropriate metallic alloy having the required strength, rigidity and hardness. The blade is comprised generally of a disc member denoted generally by the reference character 11. This disc 11 is a metal stamping formed in an appropriate stamping operation to assume the fixed form herein shown and described. The disc 11 has a flat annular body portion 12 which in the normal operating position of the cutting blade is disposed in a generally horizontal plane so as to be rotated by a vertically disposed driving shaft of a mower or the like. Extending at an incline upwardly from the plane of the flat body portion 12 is an upwardly cupped portion 13. Disposed centrally of the portion 13 is a central portion 14, the portions 13 and 14 being joined by a short horizontally disposed step at their junction.

Figure 7:
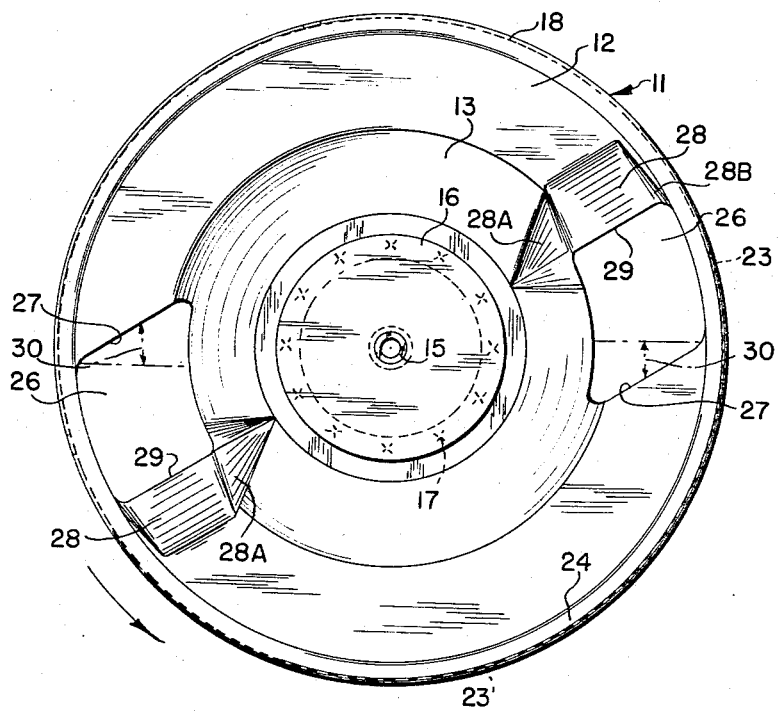
FIGURE 7 is a plan view looking upwardly at the bottom of our preferred form of improved cutting blade.

A hub portion 15 in the form of a cylindrical bushing is positioned so as to extend axially of the disc 11 through a central opening in the portion 14. A reinforcing plate 16 having a round periphery is secured by spot welds 17 to the disc 11 at the stepped junction of portions 13 and 14, as illustrated. The plate 16 adds strength and rigidity to the cutting disc. As seen in the drawings, the hub portion 15 has an intermediate portion between portion 14 and plate 16 and the hub portion 15 extends through axially aligned openings in the portions 14 and 16. The hub portion 15 is preferably welded to the portions 14 and 16 so as to firmly secure the parts together. A driving shaft, not shown, of a rotary mower is accommodated in the bore of the hub portion 15 and is secured thereto in such manner that rotation of the driving shaft simultaneously rotates the disc 11 in a cutting direction. In FIGURES 1, 6 and 7, the direction of rotation of the cutting disc 11 during its usual cutting operation is indicated by the curved arrows placed outside the periphery of the cutting disc.

Formed on the disc 11 by the same stamping operating is a rim portion 18 which is integral with the body portion 12. The rim portion 18 has a hollow core 21 formed therein by the stamping operation. There is a seam or joint 22 formed along the juncture of the rim portion 18 and the body portion 12 on the under side of the disc member. Preferably the seam 22 is closed by a proper stamping operation in forming the cutting blade, but the seam 22 may inadvertently be opened to provide a crack through which water may enter into the hollow core 21 by reason of centrifugal force of the rotating cutting blade throwing water outwardly. To permit the escape of water which may have inadvertently entered the hollow rim portion, there are provided a plurality of openings 23 in the outer wall of the rim portion 18. In the structure illustrated, there are four such openings 23 equidistantly spaced around the circumference of the rim portion 18. Centrifugal force causes any water which inadvertently might enter the interior of the rim portion 18 to be dispersed out through the drain openings 23.

It is to be noted that the rim portion 18 extends upwardly to the top edge 19 and downwardly to the bottom edge 20. The top edge 19 is in a horizontal plane parallel to but disposed upwardly from the horizontal plane of the body member 12. The bottom edge 20 is disposed in a horizontal plane substantially below the horizontal plane of the body portion 12. Thus, the plane of the top edge 19, the plane of the bottom edge 20, and the plane of the body portion 12 are substantially parallel to each other with the plane of the body portion 12 being intermediate the planes of the edges 19 and 20.

The rim portion 18 on the upper side thereof has an inclined inner wall 24 which extends in a slope upwardly and radially outwardly from the body portion 12 to the top edge 19. The inclination of the inner wall 24 of the rim portion 18 is such that cut grass, other cut vegetation, and stones or other foreign material, disposed in the upper side of the cutting blade and thrown out by centrifugal force during rotation of the cutting blade, are thrown against the inclined wall 24 and deflected thereby. The inclination of the wall 24 is such that such deflected material glances off and is impelled upwardly against the inner hollow wall of the mower casing and hence outwardly. The force of the deflected material is largely dissipated by being thrown upwardly and outwardly by the glancing, deflecting action provided by the inclined wall 24. Stones and other foreign material which otherwise might be forcibly thrown out of the discharge chute of such a rotary mower instead tend to be thrown upwardly and outwardly against the inner wall of the mower casing and then to drop harmlessly to the ground without injuring persons located near the mower and who otherwise might be struck by such material, and without damage to nearby objects, such as windows.

Extending through the body portion 12 in an axial direction are a plurality of open spaces 26 equidistantly spaced around the circumferential extent of the disc 11. In the form of the invention illustrated, there are two open spaces 26 disposed diametrically opposite each other. In other forms of structures, there may be more than two such open spaces 26 as long as they are equidistantly spaced around the cutting blade so as to provide proper balance and equilibrium.

Disposed along the trailing side of each open space 26 is a cutting edge 27. In the form of structure illustrated, each cutting edge 27 is formed by a suitable stamping or grinding operation to provide an appropriate sharp longitudinal cutting edge 27. The side of each open space 26 upon which the cutting edge 27 is positioned is referred to as a trailing side because it is on the side of the open space which is away from the direction of the rotative movement of the disc in its normal operation condition. Each cutting edge 27 is disposed at an angle, on the order of a 30° angle, to a radially extended line passing through the axis of the hub 15 and the radially outer end of the cutting edge 27. This angle of the cutting edge 27 is denoted by the reference character 30. This angle 30 is by coincidence on the order of 30° to such radial line. This inclination of the cutting edge is such as to provide an efficient slicing action to meet upstanding grass and other vegetation in a manner to obtain an efficient and rapid cutting action.

The body portion 12 at the leading side 29 of each open space 26 is displaced upwardly from the plane of the body portion 12 to provide an inclined deflector 28. The deflector 28 is integral with the body portion 12 and is formed by bending or distorting the metal in the stamping operation to provide the deflector 28 extending upwardly in a slope from the body portion 12 to the leading side 29 of each open space 26. The side 29 is referred to as leading because it is on the side of the open space 26 directed toward the direction of rotation of the cutting blade in its normal cutting operation. The deflector 28 has inclined sides 28A and 28B which gradually extend upwardly to join the deflector 28 and provide the shroud form illustrated in the drawings.

The plurality of deflectors 28 thus provided are in effect fan blades which, during rotation of the cutting blades, draw or suck grass or other vegetation upwardly so as to better present the same to the cutting edges 27. Matted grass or the like is drawn upwardly so as to enter and stand upwardly in the open spaces 26 and there to be severed by the cutting edges 27. Also the deflectors 28 suck up cut grass or other cut vegetation and cause it to be centrifugally thrown outwardly within the casing of the mower and out through the discharge duct in the mower casing. Any stones or other foreign material also drawn up by reason of the action of the deflectors 28 are thrown against the inclined wall 24 of the rim portion 18 and otherwise thrown upwardly above the level of the top edge 19 of the rim portion 18.

The cutting blade having the described cutting edge and deflector thus provides an efficient cutting action and also a good suction action for improving the cutting action and also for safely and properly deflecting material outwardly by centrifugal force during the rotation of the cutting blade.

It is to be noted that the lower edge 20 of the rim portion 18 is substantially below the horizontal plane in which are disposed the cutting edges 27 carried by the body portion 12. Thus the rim portion 18 provides an ever present guard against intrusion of objects radially inwardly of the cutting discs where such objects might otherwise be cut or injured by the cutting edge 27. To illustrate this, the toe of the shoe of an operator is illustrated in FIGURE 3, the toe being indicated by the reference character 25. By reason of the inclined top of the toe 25 illustrated being under the edge 20, the cutting edges 27 are spaced upwardly from the toe 25. Further inward protrusion of the toe 25 having an inclined top as illustrated only tends by a camming or wedging action to raise the cutting blade and the mower upwardly so as to maintain the vertical distance between the top of the toe 25 and the cutting edges 27. One would almost have to purposely reach down, around and upwardly in order to contact the cutting edges 27, which action is not likely in the usual operation of such mowers. It is to be noted also that the rim portion 18 extends completely around the disc and there are no breaks or interruptions in the continuity of the rim portion 18, and particularly around the lower edge 20 thereof, through which an object might intrude radially inward and into the path of the cutting edges 27.

The outer wall of the lower portion of the rim portion 18 is rounded or sloping as it extends from the outermost periphery of rim portion 18 to the lower edge 20. Thus, when the rim portion 18 meets a resistant object having such a contour and size that it is capable of being ascended, such as the raised edge of a sidewalk or driveway or a stone, the rim portion ascends or rides up on such a resistant object. This raises or tilts the whole cutting blade and mower on the side of the object encountered and thus avoids the impact or blow otherwise encountered. This helps prevent the bending or distortion of the driving shaft, and consequent injury of the mower engine, that otherwise occurs when a rotary cutting blade suddenly strikes such a resistant object, and the impact is transmitted to the driving shaft. The cutting blade, by the camming action provided by this outer sloping wall of the rim portion, is also raised to raise the cutting edges out of the way of the encountered resistant object.

It is to be noted further that the top edge 19 is in a plane spaced upwardly from the plane of the leading side 29 of each deflector 28. Thus, if the cutting blade were mistakenly mounted on the mower so as to position the edge 19 downwardly and the edge 20 upwardly, the rim portion 18, and particularly the edge 19 thereof, would similarly guard the side 29 from intrusion by toe or the like of an operator. Otherwise the leading side 29 of each opening might act as a cutting edge which would cut or injure the toe or other part intruding under the cutting blade. Also, as previously described, the form of the rim portion 18 by having the top edge 19 and the inclined wall 24 provides deflecting action.

It has been found that greatly improved results in cutting action are obtained with our improved rotary cutting blade and, even more important, greater safety is assured to the operator and to others through the use of our new rotary cutting blade. Those familiar with the operation of rotary mowers and to the problems and dangers inherent in their use will readily appreciate the marked advantages and benefits afforded by the structure here disclosed and the principle of the new cutting blade herein shown and described.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A cutting blade for a rotary-type mower comprising an annular disc having a central opening for accommodating a driving shaft of said motor for rotation of the blade by said shaft, said disc having a rim portion extending around the circumference thereof, said rim portion having opposite axially spaced edges, said disc having a body portion disposed radially inward from said rim portion and disposed in a plane intermediate, spaced from and generally parallel to planes passing through the said opposite axially spaced edges of said rim, said body portion having a plurality of open spaces extending therethrough in an axial direction, each said open space having a leading edge and a trailing edge in the direction of cutting rotation of the blade, each said trailing edge being substantially in said intermediate plane of said body portion forming a cutting edge for cutting vegetation upstanding in said open space during rotation of the blade, each said leading edge being displaced from the plane of said body portion upwardly toward, but short of, the generally horizontal plane passing through the edge of said rim portion disposed upwardly in the operating position of said blade, said body portion extending from said leading edge downwardly to said intermediate plane to provide an air deflector blade leading each said open space, each said cutting edge formed by the trailing edge being guarded radially outward therefrom by said rim extending downwardly to the lower edge thereof in a plane substantially spaced axially from the said intermediate plane of said body portion, said deflector blades drawing air upwardly through said open spaces and centrifugally impelling the drawn air and cut vegetation from said blade, said rim portion being disposed radially outward of said leading edges to meet and deflect material thrown radially outwardly of said leading edges by the cutting blade.

2. A rotary cutting blade for a rotary mower having an upright shaft for rotating the blade in a generally horizontal plane, comprising a stamped metal disc having a hub portion at the axis thereof for securement to a said shaft, and disc having an integral rim portion extending around its periphery and defining a substantially closed annulus having a hollow core, said disc having a relatively flat body portion extending radially inward from said rim portion, said flat body portion being disposed in a generally horizontal plane in the operative cutting position of said blade and said rim portion extending downwardly and upwardly from the plane of said body portion to provide an annular guard, said body portion having a plurality of open spaces extending therethrough and positioned substantially equidistantly therearound and radially inward from said rim portion, said body portion carrying a cutting edge substantially in the plane of said body portion along a trailing side of each said open space, said cutting edges being in a plane above the plane of the bottom edge of said rim portion and being directed in the direction of cutting rotation of the blade to sever vegetation upstanding in said open spaces, said body portion carrying a deflector along an opposite and leading side of each said open space, each said deflector extending at an incline upwardly from the plane of said body portion to the said opposite and leading side of the respective open space and to a plane below the plane of the upper edge of said rim portion, said deflectors being revolvable with said blade to draw air upwardly through said open spaces and centrifugally moving the air above said disc in the plane of said deflector, the annular guard provided by said rim portion protecting said cutting edges from intrusion radially inwardly of said rim portion in the plane of said cutting edges and guarding against radial outward propulsion of material thrown by said cutting blade in the plane of said deflectors, the said drawing and movement of air aiding to induce vegetation to stand upright in said open spaces and to centrifugally impel vegetation cut by said cutting edges upwardly and tangentially outwardly of said disc.

3. A rotary cutting blade for a mower comprising a metal disc having a domed control portion adapted to be secured to a vertically disposed driving shaft for rotating the disc in a generally horizontal plane, said disc having formed around its circumference a ring portion formed from the disc, said disc having a plurality of equidistantly spaced open spaces extending therethrough, said disc carrying a cutting edge along the trailing side of each open space, said rim portion extending downwardly around the disc to a plane parallel to and substantially below the common plane passing through said cutting edges to guard the cutting edges from objects intruding radially inward of the rim portion in said common plane of the cutting edges, said disc carrying an inclined deflector blade along the leading side of each open space above said common plane of said cutting edges, said deflector blades being inclined away from the direction of rotation of the disc in a cutting operation, said deflector blade upon rotation of the disc moving air and material drawn therewith upwardly through the said open spaces and centrifugally impelling the material outwardly above said common plane of said cutting edges, said rim portion extending upwardly from said common plane of the cutting edges and inclined radially outwardly to provide an annular inclined surface to meet at an angle material centrifugally impelled radially outward of the disc and deflect the same upwardly for dampening the velocity of such material, said rim portion extending upwardly to a plane parallel to and spaced substantially above a common plane through said deflector blades along the leading sides of said open spaces to guard the deflector blades from objects intruding radially inward of the rim portion in said common plane through said deflector blades.

References Cited

UNITED STATES PATENTS

| 2,917,826 | 12/1959 | Pohr | 56—295 X |
| 3,096,608 | 7/1963 | Williamson | 56—295 |
| 3,097,469 | 7/1963 | Belfiore | 56—295 |
| 3,103,094 | 9/1963 | Cook | 56—295 |

ABRAHAM G. STONE, *Primary Examiner.*

RUSSELL R. KINSEY, *Examiner.*